C. A. MURRAY.
Machine for Cutting Meat.

No. 226,184. Patented April 6, 1880.

WITNESSES:
Frank M. Reese
Wesley Johnston

INVENTOR
Charles A. Murray
by
A. C. Johnston ATTORNEY

UNITED STATES PATENT OFFICE.

CHARLES A. MURRAY, OF PITTSBURG, PENNSYLVANIA, ASSIGNOR OF ONE-HALF OF HIS RIGHT TO JOHN FAHY, OF SAME PLACE.

MACHINE FOR CUTTING MEAT.

SPECIFICATION forming part of Letters Patent No. 226,184, dated April 6, 1880.

Application filed October 24, 1879.

*To all whom it may concern:*

Be it known that I, CHARLES A. MURRAY, of Pittsburg, county of Allegheny, State of Pennsylvania, have invented a new and useful Improvement in Meat and Vegetable Cutters; and I do hereby declare that the following is a full and exact description thereof, reference being had to the accompanying drawings, and to the letters of reference marked thereon.

My invention relates to an improvement in meat and vegetable cutters; and it consists of a series of knives of a peculiar shape arranged on a shaft mounted in a frame, and a cutting-table consisting of a series of reversible bars clamped to the frame and slightly inclined, so that their inner and upper edges are about on a line with the axis of the shaft of the cutting-knives, and a pivoted hopper having an adjustable partition.

To enable others skilled in the art to make and use my invention, I will proceed to describe its construction and operation.

Figure 1:
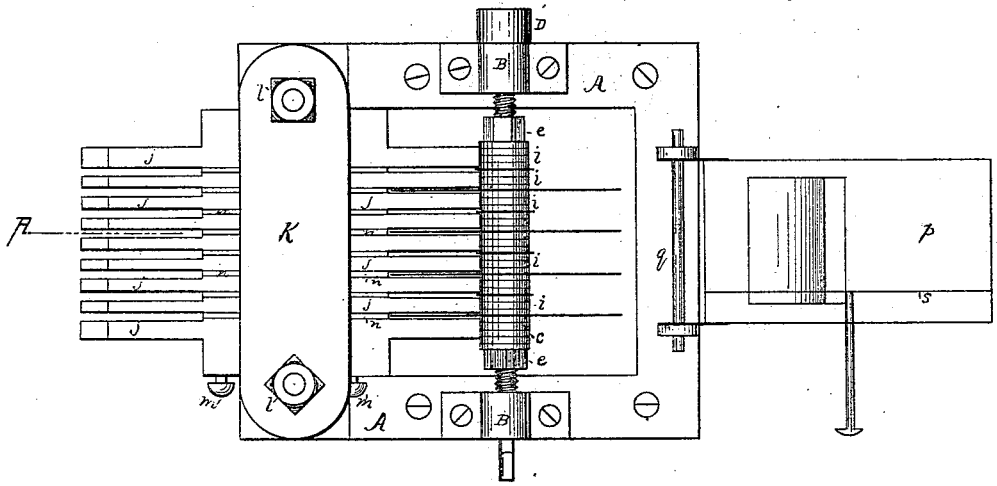
Figure 2:
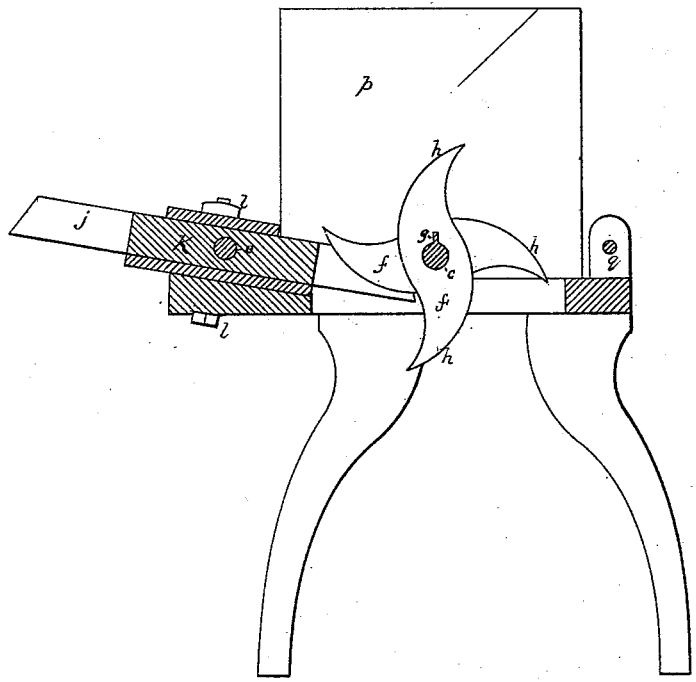

In the accompanying drawings, which form part of my specification, Figure 1 is a top view or plan representing the hopper thrown back. Fig. 2 is a vertical and longitudinal section of the machine.

In the drawings, A represents the frame of the machine, in which is mounted, in bearings B, a shaft, C, provided with a driving-pulley, D. The shaft C is provided with screw-threads and clamping-nuts e, for clamping the cutters f in position on the shaft C. The shaft C is also provided with a feather, g, which fits into recesses in the openings in the cutters f, the size of the openings being equal to the diameter of the shaft C.

The cutters f, the form of which is clearly shown in Fig. 2, are made of any suitable material, and are provided with curved cutting-edges h. The cutters are separated through the medium of washers i. The cutters f are so arranged upon the shaft C that they will pass between the bars j, which form the cutting-table, upon which rests the meat or vegetables to be cut.

The reversible bars j are held in position upon the frame A by the clamping-bars k and screw-bolts l, and are adjusted laterally through the medium of adjusting-screws m and strips n, and are prevented from moving longitudinally by means of the bolt o, which passes through the reversible bars j.

The bars j are made reversible so that the cutting-table will form openings of different widths for the cutters to pass through in the operation of cutting, thereby adapting the cutting-table to cut coarse or fine, as may be desired. The hopper p is pivoted to the frame at q, and is provided with an adjustable partition, s, to keep the meat or vegetables to be cut compact and adapt the machine to cut with one or more knives, as may be desired, the partition s being placed between the cutters f when it is desired to use a less number of knives than the whole.

In the operation of cutting, the meat or vegetables to be cut are fed in at the opening of the hopper, and the action of the cutters coming in contact with the meat or vegetables will cut the mass to the fineness desired.

Having thus described my improvement, what I claim as of my invention is—

1. A cutting-table consisting of a series of reversible bars, in combination with revolving cutters, substantially as herein described, and for the purpose set forth.

2. In a meat or vegetable cutter, the combination, with a series of curved cutters mounted upon a revolving shaft, of the hopper provided with an adjustable partition or follower, adapted to be placed between the cutters, whereby the machine is adapted to cut with one or more knives, substantially in the manner herein shown and described.

3. In a meat or vegetable cutter, the reversible bars j, in combination with the clamping-bar k, screw-bolts l, set-screws m, with bolt o, passing through said reversible bars, substantially as and for the purpose set forth.

C. A. MURRAY.

Witnesses:
A. C. JOHNSTON,
FRANK M. REESE.